United States Patent
Böckmann et al.

[11] Patent Number: 6,109,407
[45] Date of Patent: Aug. 29, 2000

[54] PROCESS FOR THE CONTROL OF A TRANSMISSION

[75] Inventors: Gerhard Böckmann, Laatzen; Andreas Böhm, Wennigsen, both of Germany

[73] Assignee: WABCO GmbH & Co, OHG, Hannover, Germany

[21] Appl. No.: 09/268,370

[22] Filed: Mar. 15, 1999

Related U.S. Application Data

[60] Provisional application No. 60/078,339, Mar. 17, 1998.

[51] Int. Cl.[7] .............................. F16H 59/56; F16H 59/42
[52] U.S. Cl. ......................................... 192/3.63; 74/336 R
[58] Field of Search .................................. 192/3.63, 3.61, 192/3.62, 3.54; 74/335, 336 R; 477/70, 79, 80, 81, 71, 75

[56] References Cited

U.S. PATENT DOCUMENTS

| | | | |
|---|---|---|---|
| 4,648,290 | 3/1987 | Dunkley et al. | 477/70 X |
| 5,022,509 | 6/1991 | Schweiger | 477/79 X |
| 5,081,588 | 1/1992 | Holmes et al. | 477/904 X |
| 5,103,948 | 4/1992 | Sato et al. | 192/3.555 X |
| 5,138,905 | 8/1992 | Kouno | 477/80 |
| 5,277,290 | 1/1994 | Lasoen | 74/335 X |
| 5,389,053 | 2/1995 | Steeby et al. | 74/336 R X |
| 5,408,895 | 4/1995 | Chan et al. | 74/336 R X |
| 5,415,604 | 5/1995 | Bates et al. | 477/78 |
| 5,488,878 | 2/1996 | Manz | 192/3.63 X |
| 5,592,851 | 1/1997 | Bates et al. | 74/336 R |
| 5,664,458 | 9/1997 | Stasik et al. | 74/336 R |
| 5,842,376 | 12/1998 | Dresden, III et al. | 74/336 R X |

*Primary Examiner*—Charles A. Marmor
*Assistant Examiner*—Ankur Parekh
*Attorney, Agent, or Firm*—Proskauer Rose LLP

[57] ABSTRACT

A process for the control of non-synchronized, manually shiftable vehicle transmissions which are actuated in vehicles of new construction by means of an automated transmission control system whereby the driver is able to select a desired gear by means of an operating unit which is connected electrically to the transmission control system. When the vehicle is stopped and the clutch is disengaged practice of the invention prevents a situation in which the engagement of a gear is prevented by a tooth-on-tooth position of the transmission claws. The disclosed process makes it possible to engage the selected gear in all operating states of the vehicle in a simple and reliable manner. In this regard, a desired gear is first selected, and the clutch is then disengaged. When a suitable speed of the transmission input is then reached, a gear to be engaged is automatically engaged. Thereby, the engagement of a gear when the vehicle is stopped is systematized and facilitated for the driver. Furthermore the driver need not disengage and then again engage the clutch repeatedly in order to avoid a tooth-on-tooth position. The process is used preferably in utility vehicles.

41 Claims, 3 Drawing Sheets

PROCESS FOR THE CONTROL OF A TRANSMISSION

CROSS REFERENCE TO RELATED APPLICATIONS

This application contains some subject matter in common with the concurrently filed U.S. patent application Ser. No. 09/268,371 of the assignee.

BACKGROUND OF THE INVENTION

The present invention relates to a process for the control of a transmission with several gears for an engine-driven vehicle provided with a control system for the transmission, a clutch to connect the engine to the transmission, an operating unit for the selection of a desired gear and means for detecting a rotational speed of the transmission input.

A process of this type is disclosed, for example, in WO97/44210 (U.S. Pat. No. 5,741,202).

The known process is used to control a manually switchable, non-synchronized vehicle transmission of conventional construction, with a plurality of gears, and which is operated in part automatically by means of a control system, which shall be hereinafter referred to as a transmission control system. The automation is with regard to the mechanical movements required for changing gears, which are carried out by an electrical/pneumatic adjusting device as a result of triggering signals is not connected mechanically to the transmission as in conventional transmissions, but rather transmits corresponding signals to the transmission control system when it is actuated.

The transmission is connected to the driving engine of the vehicle via a clutch operable by the driver in such manner that it can be uncoupled. In the known process, the transmission control system effects automated switching from the currently used gear into the gear selected by the driver, depending upon an actuation of the operating unit by the driver. At the same time, the transmission control system transmits suitable control signals to an engine control device in addition to the trigger signals transmitted to the electric/pneumatic adjusting device. These control signals control the engine performance in such manner that the clutch need not be opened for a gear change. As a result the driver is relieved from having to actuate the clutch during a change of gear during travel.

When the transmission is in neutral position, i.e. when no gear is engaged and the vehicle is stopped or coasts at a relatively low speed, the transmission input rotates at the relatively high speed of the drive engine with an engaged clutch, while the transmission output is stopped, or rotates at a relatively low speed. In such event, the transmission control system cannot achieve any synchronization of the toothed wheels of the transmission, and therefore, no gear can be engaged. Engaging a gear in such situation is only possible when the clutch is disengaged.

After disengaging the clutch, the speed of the transmission input is reduced rather quickly, until it comes to a stop. When necessary, this reduction in speed can be further assisted by actuation of a brake acting upon the transmission input. In such case, a problem may occur by which a gear selection is prevented by a tooth-on-tooth position of the transmission claws. Such a condition cannot be easily recognized by the driver when utilizing a transmission control system of the aforementioned type. In conventional transmissions in which a gear shift lever is mechanically connected to the transmission, the driver of the vehicle would be able to recognize haptically whether a tooth-on-tooth position has occurred by sensing a certain degree of resistance as he actuates the gear shift lever. In such event, it would then be necessary to engage the clutch to remedy the situation.

In a transmission control system of the presently described type to which the invention is directed, no haptic message is transmitted to the driver through a gear shift lever.

It is therefore the object of the present invention to propose a process for the control of a non-synchronized transmission which would make it possible to easily and reliably engage a selected gear, in particular while the vehicle is stopped.

SUMMARY OF THE INVENTION

In accordance with these and other objects of the invention, a process is provided for the control of a transmission, with a plurality of gears, for an engine driven vehicle. The vehicle is equipped with a control system for the transmission, a clutch to connect the engine to the transmission, an operating unit for the selection of a desired gear and a detector for detecting a rotational speed of a transmission input. A verification is made as to whether a driver-selected gear is selected by means of the operating unit. In a following step, disengagement of the clutch is confirmed following verification that the driver-selected gear has been selected. A rotational speed of the transmission input is then compared with a predetermined speed range when it has been confirmed that the clutch was disengaged. A gear to be engaged is then automatically engaged when the rotational speed of the transmission input has reached the predetermined speed range.

The invention can be advantageously used for vehicles with a clutch actuated by the driver, as described initially herein, as well as for vehicles with an automatic shifting device for the clutch, for example, including an adjusting cylinder operated with a pressure medium. The list of advantages of the invention given below, as well as the example of an embodiment, apply also to utilization of the invention in a vehicle with an automated shifting device for the clutch.

The invention provides the advantage that the engagement of a gear while the vehicle is stopped is systematized and simplified for the driver. A particularly advantageous aspect of the invention resides in the fact that the driver no longer needs to recognize whether a suitable speed range of the transmission input, at which the engagement of a gear is possible, has been reached and which is present for a relatively short time.

The invention provides a further advantage in that the driver need not disengage and engage the clutch several times in order to avoid the previously mentioned tooth-on-tooth position. Since the disengagement of the clutch takes place after the selection of a desired gear in the process according to the invention, contrary to the shifting process in a conventional, manually operated transmission, a suitable layout of the transmission control system ensures that the gear has already been engaged before the stopped state of the transmission input has been reached, i.e. during a relatively short period of time after the disengagement of the clutch during which the rotational speed of the transmission input lies within a suitable, predetermined rotational speed range within which a gear can be engaged. As a result, even inexperienced drivers have no difficulty engaging a gear in a non-synchronized transmission through the application of the process according to the invention.

In an advantageous further development of the invention, the predetermined rotational speed range can be changed as a function of the vehicle speed or the speed of the transmission output and/or the gear ratio to be expected for the gear to be engaged (EGANG). As a result, the process can also be advantageously used when the vehicle is coasting without any gear being engaged.

In another advantageous further development of the invention, a verification is made upon reaching the predetermined rotational speed range as to whether a gear other than the gear selected by means of the operating unit would allow for better travel behavior to be expected under current operating conditions, and which would thereby be more suitable. If it is found that another gear would be better suited, this gear is engaged instead of the gear selected by the driver by means of the operating unit.

In certain vehicles of newer construction, the vehicle mass is determined automatically by electronic devices, for example, by an electronic braking system in which the vehicle mass can be calculated on the basis of the braking forces exerted by the brakes and decelerations resulting from same. The transmission control system, which can be supplied with information on the calculated vehicle mass, for example, via a data bus system, is able to determine which gear, in view of the vehicle mass, would be advisable in order to start up the vehicle. For example, if the driver were to select the highest gear for starting up by mistake, by using the operating unit, the transmission control system would automatically select and engage a lower gear or the lowest gear as a function of the vehicle mass. This feature makes it possible to avoid engine stalling.

In yet another advantageous further development of the invention, a check of the speed of the transmission input, as well as a comparison with the predetermined rotational speed range for the purpose of automatic gear selection after clutch disengagement, is carried out only if less than a predetermined time span has passed from the moment of gear selection by means of the operating unit until the disengagement of the clutch. At the end of this predetermined time span, the disengagement of the clutch does not therefore cause the gear to be engaged.

In still another advantageous further development of the invention, stored information on the gear selected by means of the operating unit is erased after the passage of the predetermined time. This provides the advantage that an involuntary actuation of the operating unit or of the clutch does not result in an unwanted engagement of a gear. A gear already selected can advantageously be taken back again by means of the operating unit or another operating element, for example, by actuating a neutral switch.

The invention is explained in further detail below with reference to the drawings.

DETAILED DESCRIPTION OF THE PREFERRED EMBODIMENT

Figure 1:
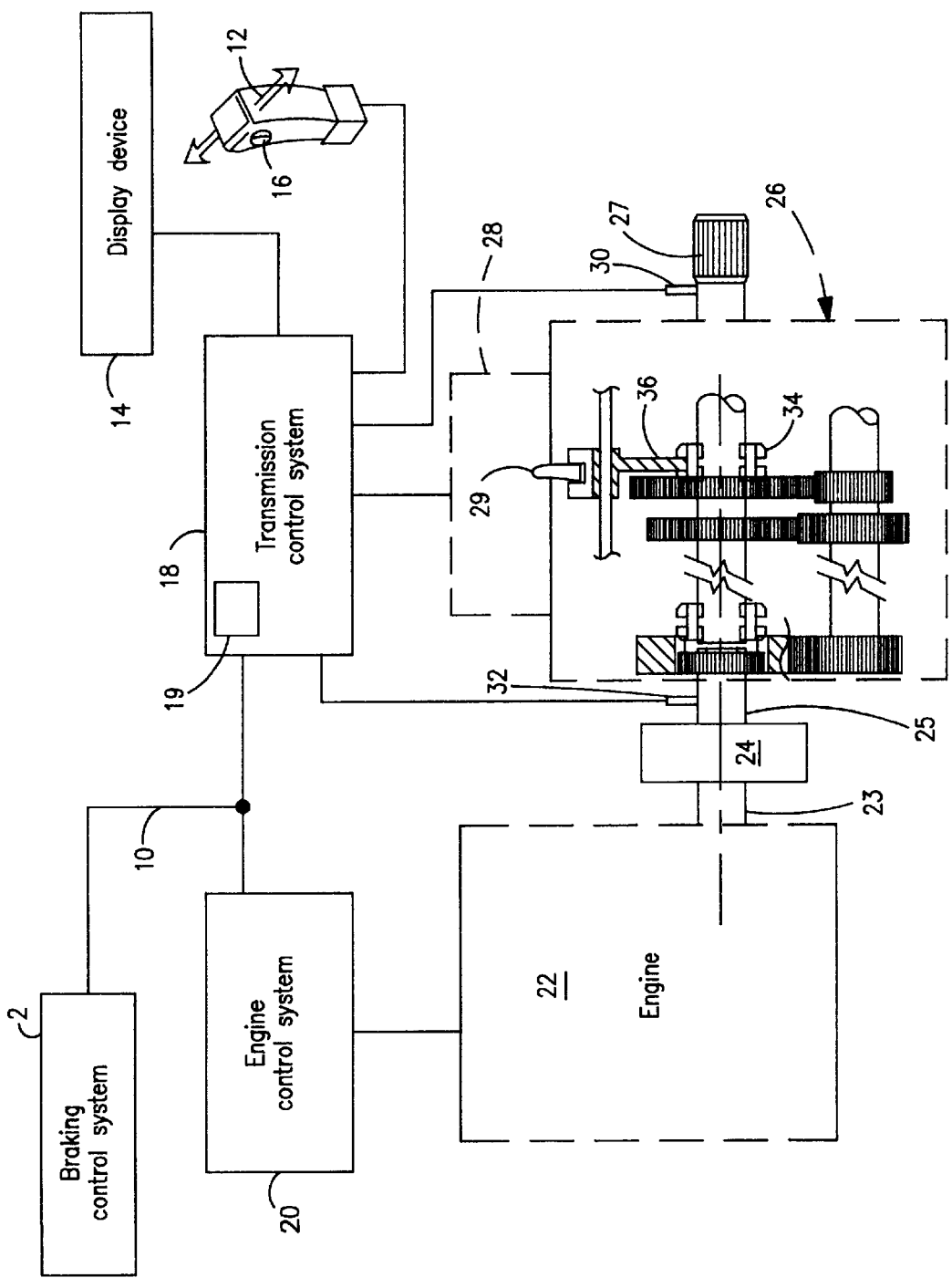
FIG. 1 is a schematic depiction of an apparatus for carrying out the process according to the invention.

The apparatus shown in FIG. 1 includes an engine 22 which serves to drive a vehicle (not shown) in which the depicted apparatus is used. The engine 22 transmits driving power in the form of rotational movement via an engine drive shaft 23 to a clutch 24 of known construction. The clutch 24 can be moved by the driver of the vehicle by means of a pedal into a disengaged and engaged states. Without actuation of the pedal, the clutch is engaged. Disengagement of the clutch is achieved when the pedal is actuated. In its engaged state, the clutch 24 transmits the rotational movement of the engine drive shaft 23 to the transmission drive shaft 25. When the clutch is disengaged, on the other hand, this rotational movement is not transmitted to the transmission drive shaft 25.

The transmission 26 serves to transmit the rotational movement from the transmission drive shaft 25 to a transmission output shaft 27 with variable gear ratio. The transmission output shaft 27 is connected via other parts, such as, for example, an additional shaft, a universal joint, a differential gear, etc., to the drive wheels of the vehicle.

The transmission 26 is provided with a plurality of toothed wheels which can be brought into engagement with each other in alternation for the selection of a desired gear ratio. To adjust the gear ratio or the combination of toothed wheels, mechanical transmission elements 34, 36 are provided, by means of which the toothed wheels can be shifted. The mechanical transmission elements 34, 36 are moved, by means of a gearshift finger 29, by an electrically actuated transmission actuator 28. The transmission actuator 28 may be equipped, for example, with a servo-system equipped with electric motors. In a preferred embodiment of the invention, the transmission actuator 28 is provided with adjusting cylinders actuated by pressure media which can be subjected to alternating pressure via solenoid valves from a pressure media source, for example, a compressed-air tank.

For the control of the transmission functions, the transmission actuator 28 is connected via electrical lines to a transmission control system 18. The transmission control system 18 is furthermore connected to speed sensors 30, 32 which transmit information on the transmission input speed, i.e. the speed of the transmission drive shaft 25 and the transmission output speed, i.e. the speed of the transmission output shaft 27 to the transmission control system 18.

Furthermore, the transmission control system 18 is connected to an operating unit 12, 16 which is provided with an actuating lever 12, and a neutral switch 16 preferably installed on the actuating lever 12. By using the operating unit 12, 16, the driver of the vehicle can indicate to the transmission control system 18 which gear should be engaged. In a preferred embodiment of the invention, the transmission 26 is shifted up by one gear by moving the actuating lever 12 forward, and is shifted down by one gear by moving it back. Actuation of the neutral switch 16 causes the transmission 26 to be shifted into neutral position, i.e. no gear is engaged.

The transmission control system 18 is connected via a data bus system 10 to other control systems in the vehicle, for example, an engine control system 20 and a brake control system 2, for the exchange of data. The transmission control system 18 is able to inform the engine control system 20 via suitable data messages, for example, that a certain motor r.p.m. is to be selected for a shift in gears. The transmission control system 18 can receive information via other data messages from the brake control system 2, for example, information concerning certain vehicle data, such as vehicle mass.

The transmission control system 18 is furthermore connected to a display device 14 which is located preferably within the driver's field of vision, and on which certain information can be displayed, for example, the gear selected by the driver AGANG by means of the operating unit 12, 16, or the gear (EGANG) to be engaged EGANG or already engaged. The trnnsmission control system 18 furthermore contains a rewritable non-volatile memory 19.

The transmission control system 18, the engine control system 20 and the brake control system 2 are preferably in the form of electronic control devices. They may also be provided as one single control device.

Figure 2:
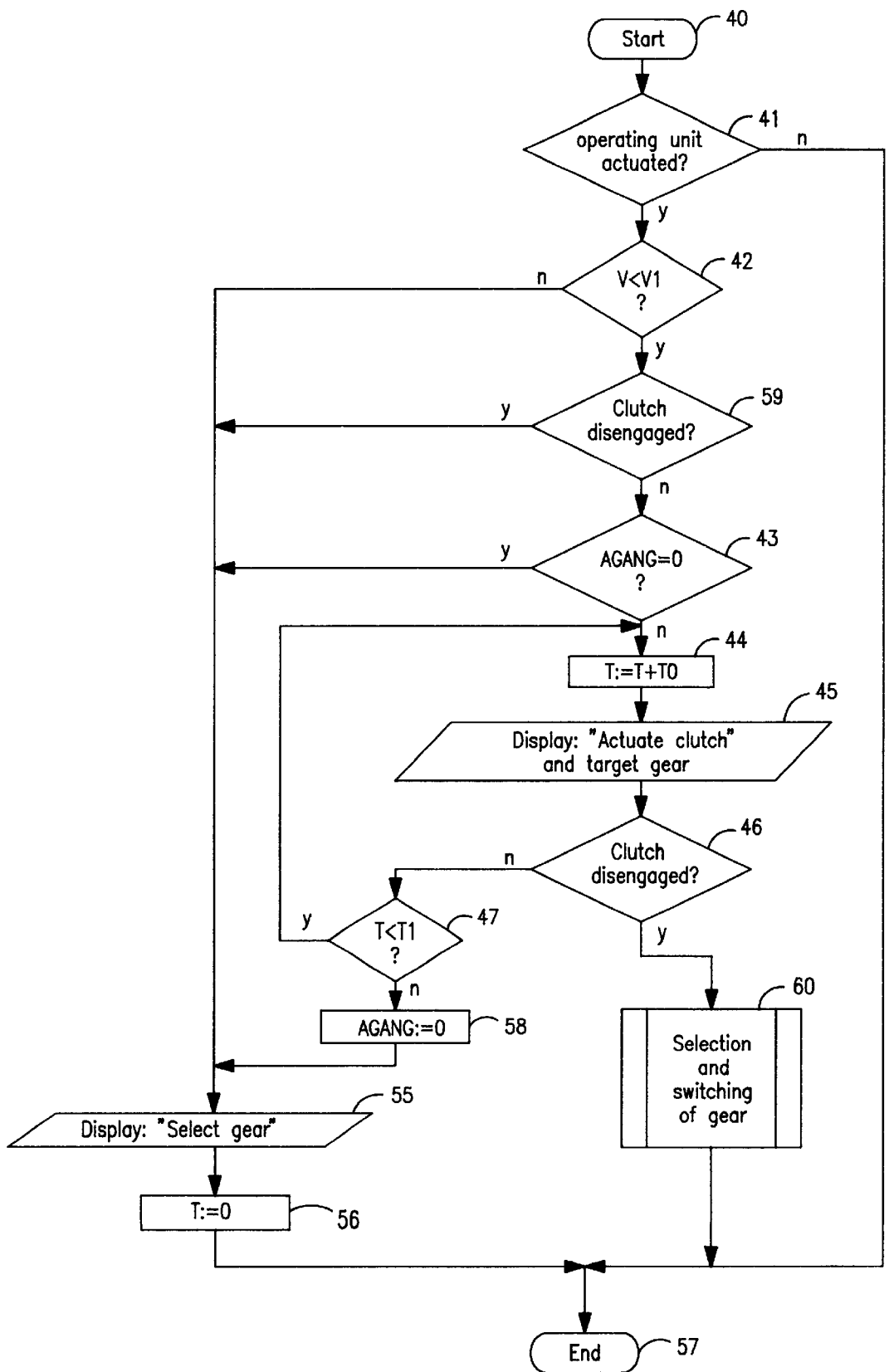
FIG. 2 is a flow chart illustrating an advantageous embodiment of the process according to the invention.

A preferred embodiment is explained below with reference to FIGS. 2 and 3. The process shown therein is preferably designed as part of a control program for a microprocessor contained in the transmission control system 18. The process begins at block 40 following an initialization phase, which is not shown.

In a following decision block 41 a verification is made whether the operating unit 12, 16 has been actuated. If this is not the case, no further action is required, and the program branches off directly to block 57 where the process ends without going to the additional process steps. Otherwise, the program branches off to an additional decision block 42 where a verification is made whether the vehicle speed V is less than a predetermined speed value V1In a preferred embodiment of the invention, predetermined speed value V1 is representative of a vehicle speed close to vehicle stoppage. If it does not fall short of the predetermined speed value V1, the program executes blocks 55, 56, and then also branches off to block 57 where the process ends. Predetermined speed value V1 is stored in the rewritable, non-volatile memory 19.

In the data transfer block 55 which is carried out in this case, information is transmitted to the display device 14 which informs the driver that he must select a desired gear for successful engagement of a gear. To show this information, a lamp may be included in the display device 14 for this purpose. If the display device 14 is designed to show direct character displays, it is then also possible to transmit suitable information directly, for example, "Select Gear" to the display device 14. In block 56 which is also carried out, a time counter T, which will be described in further detail below, is reset to a starting value of zero.

If, however, the vehicle speed V falls short of the predetermined speed value V1 in the decision block 42, the program continues with another decision block 59 in which a verification is made as to whether the clutch 24 is disengaged. This may be implemented, for example, by evaluating the signal of a switch or a switch contact located in the clutch. The state can also be recognized alternatively through a comparison of the speed information detected by the speed sensor 32 with engine speed information transmitted by the engine control system 20 via the data bus system 10. In the case of a greater deviation of this speed information data from each other, it can be assumed that the clutch is disengaged. If the clutch is already disengaged, the program executes the previously explained blocks 55, 56, and branches off to block 57 where the process ends.

If, however, it is found in decision block 59 that the clutch is not disengaged, the program continues with another decision block 43 where a verification is made whether the driver has already selected a gear AGANG. If no gear has been selected (AGANG=0) the blocks 55, 56 are carried out, and the program branches off to block 57 where the process ends. Otherwise, the program branches off to block 44. There, the time counter T is raised by one time increment T0. The time counter T serves to monitor the time which elapses from the moment of selection of the selected gear AGANG by means of the operating unit 12, 16 to the disengagement of the clutch 24.

In a subsequent data transfer block 45, information is transmitted to the display device 14 informing the driver that the clutch must be actuated to engage the gear. In a preferred embodiment of the invention, it is also possible to represent the selected gear AGANG, for example, in the form of a number on the display device 14.

A verification is then made in the decision block 46 as to whether the clutch 24 is disengaged. If the clutch is not disengaged, the program branches off to a decision block 47 in which the time counter T is checked to determine whether a predetermined time T1 has been exceeded. If the time counter T shows that less than the predetermined time T1 has elapsed, the program branches off again to the previously mentioned assignment block 44 in the manner of a program loop. Otherwise, the program branches off to an assignment block 58 where the selected gear AGANG is reset to the value zero and the stored information is thereby erased. Following this, the process is terminated with the execution of blocks 55, 56, 57.

If on the other hand the clutch is disengaged before the end of the predetermined time T1, the process is continued with a sub-program block 60. The sub-program block 60 is shown in greater detail in FIG. 3.

Figure 3:
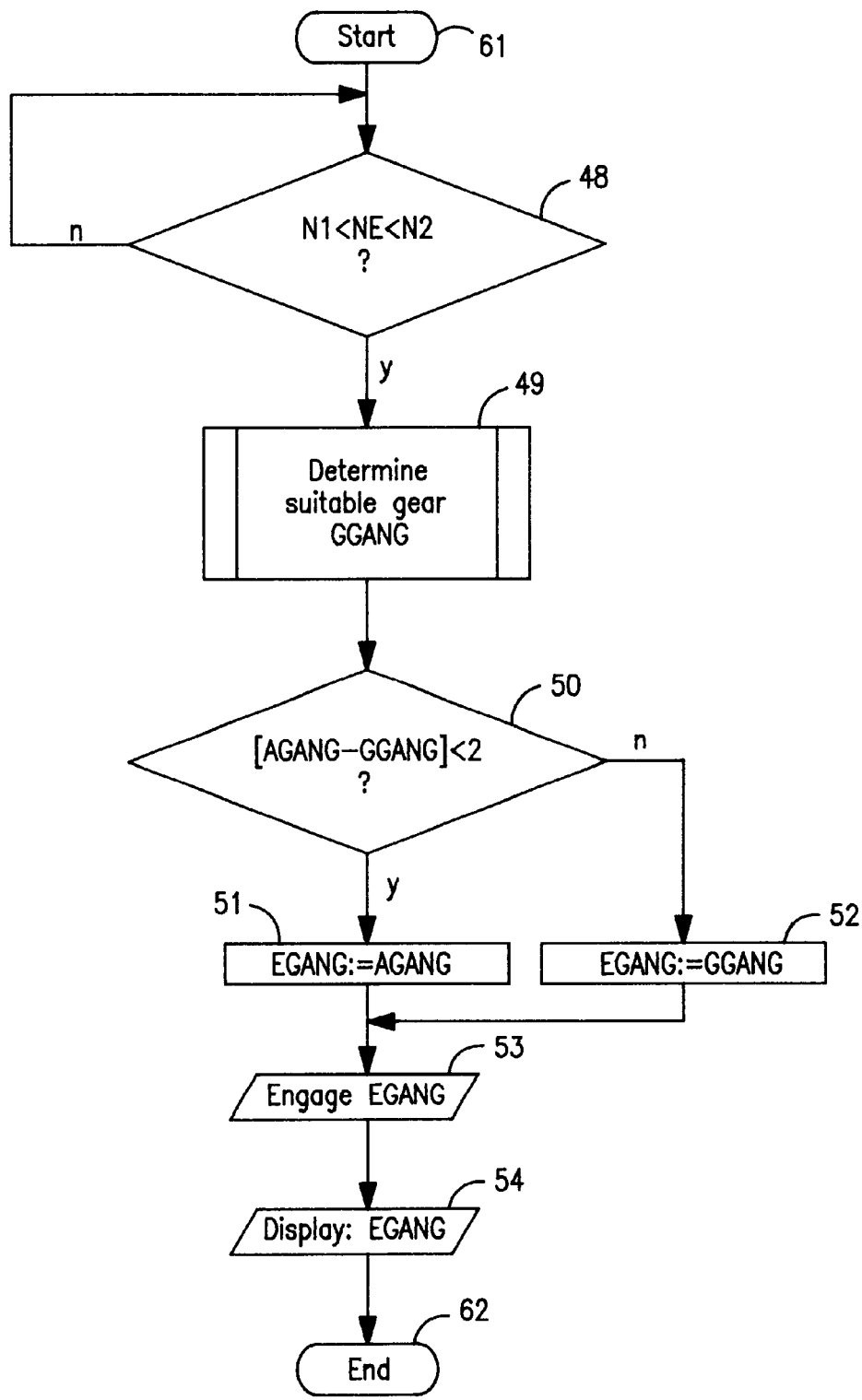
FIG. 3 is a flow chart illustrating a detail of a subprogram block of the process of FIG. 2.

In accordance with FIG. 3, the process is continued after execution of block 61 with a decision block 48 where a verification is made as to whether a rotational speed NE of the transmission input has reached a predetermined speed range. The predetermined speed range starts with a lower speed range value N1 and ends with an upper speed range value N2. In a preferred embodiment of the invention, the lower speed range value N i is zero when the vehicle is stopped. In the decision block 48, a verification is made as to whether the speed NE lies within the range defined by the limit speed values N1, N2. The decision block 48 is then repeated until the above-mentioned requirement is met. Then the sub-program block 49 continues. In the sub-program block 49, and in accordance with the already previously mentioned procedure, a particularly well suited gear GGANG under the existing operating conditions of the vehicle is determined by using the vehicle mass. The manner in which this can be done, for example, is that the fourth gear is determined to be the suitable gear GGANG with the vehicle unloaded. With medium load, the third gear, and in the range of greatest admissible load, the second gear may be determined to be the suitable gear GGANG. Additional advantageous ways of determining the suitable gear GGANG are known to persons skilled in the art.

Following this, and using the blocks 50, 51, 52, either the gear selected by the driver AGANG or, if a certain deviation exists between the gear selected by the driver AGANG and the previously determined suitable gear GGANG, the suitable gear GGANG is chosen as the gear to be engaged EGANG. For this, a verification is first made in the decision block as to whether the selected gear AGANG deviates by less than two gears upwards or downwards from the suitable gear GGANG. If this is the case, the gear to be engaged EGANG is adjusted in the assignment block 51 to the gear selected by the driver AGANG. Otherwise, it is to be assumed that the gear desired by the driver AGANG and selected by means of the operating unit 12, 16 is unsuitable for the existing operating conditions of the vehicle, so that the gear to be engaged EGANG is adjusted in the assignment block 52 to the suitable gear GGANG. As a result, the selection of the driver is thereby corrected.

By means of a data transfer block 53, corresponding triggering information is then transmitted to the transmission actuator 28, such that the gear previously determined to be engaged EGANG is engaged in the transmission. In a preferred embodiment of the invention, information is then transmitted to the display device 14 in a data transfer block 54, the display device 14 indicating to the driver the gear previously to be engaged EGANG and which is now newly engaged.

The sub-program block 60 then ends with block 62. Thereby, the process according to FIG. 3 also ends with block 57.

In a preferred embodiment of the invention the predetermined speed range N1, N2 can be altered as a function of the vehicle speed V or of the speed of the transmission output NA and the gear ratio to be expected for the gear to be engaged (EGANG). The modification of this speed range or of the speed limit values N1, N2 which delimit this speed range, is carried out in a preferred embodiment of the invention according to the following formulas:

$$N1=G*NA+NG1$$

$$N2=G*NA+NG2$$

where, as noted above, the value NA represents the transmission output speed, the value G the gear ratio to be expected for the gear to be engaged EGANG, and the values NG1, NG2 transmission-specific speed values which allow the engagement of a gear without incurring any damage. The transmission-specific speed values NG1, NG2 can be derived from the information given by the transmission manufacturer or, alternatively, can be determined through tests. In a preferred embodiment of the invention, the above-escribed modification of the speed limit values N1, N2 takes place only when a predetermined minimum value of the transmission output speed NA has been reached or exceeded. The predetermined speed range N1, N2 is stored in the rewritable, non-volatile memory 19.

What is claimed is:

1. A process for the control of a transmission, with a plurality of gears, for an engine driven vehicle which includes a control system for the transmission, a clutch to connect the engine to the transmission, an operating unit for the selection of a desired gear and a detector for detecting a rotational speed of a transmission input, the process comprising:
   verifying whether a driver-selected gear is selected by means of the operating unit;
   confirming whether the clutch is disengaged following verification that the driver-selected gear has been selected;
   comparing a rotational speed of the transmission input with a predetermined speed range when it has been confirmed that the clutch is disengaged; and
   automatically engaging a gear to be engaged when the rotational speed of the transmission input has reached the predetermined speed range,
   wherein the vehicle includes a detector for detecting a vehicle speed, the steps of the process being executed on condition that the vehicle speed is below a predetermined speed value.

2. A process according to claim 1, wherein the predetermined speed value is representative of a vehicle speed close to vehicle stoppage.

3. A process according to claim 1, wherein the predetermined speed range can be changed as a function of vehicle speed.

4. A process according to claim 1, wherein the predetermined speed range can be changed as a function of a speed of a transmission output.

5. A process according to claim 1, wherein the predetermined speed range can be changed as a function of a gear ratio to be expected for the gear to be engaged.

6. A process according to claim 1, wherein the gear to be engaged is the driver-selected gear.

7. A process according to claim 1, further comprising:
   determining whether a different gear would be better suited than the driver-selected gear as the gear to be engaged under existing operating conditions of the vehicle; and
   using the different gear as the gear to be engaged on condition that the different gear is determined to be better suited.

8. A process according to claim 1, further comprising:
   storing information on the predetermined speed value in a re-writable, non-volatile memory located in the control system for the transmission.

9. A process according to claim 1, further comprising:
   storing information on the predetermined speed range in a re-writable, non-volatile memory located in the control system for the transmission.

10. A process according to claim 1, further comprising:
    measuring elapsed time between selection of the driver-selected gear and subsequent disengagement of the clutch; and
    executing said step of automatically engaging only on condition that the elapsed time is less than a predetermined time span.

11. A process according to claim 10, further comprising:
    erasing stored information on the driver-selected gear at the end of the predetermined time span.

12. A process according to claim 1, further comprising:
    optically displaying an instruction to actuate the clutch if a driver-selected gear has been selected and the clutch is engaged.

13. A process according to claim 1, wherein the driver-selected gear selected by means of the operating unit is displayed optically.

14. A process according to claim 1, wherein the clutch must be driver-actuated.

15. A process for the control of a transmission, with a plurality of gears, for an engine-driven vehicle which includes a control system for the transmission, a clutch to connect the engine to the transmission, an operating unit for the selection of a desired gear and a detector for detecting a rotational speed of a transmission input, the process comprising:
    verifying whether a driver-selected gear is selected by means of the operating unit;
    confirming whether the clutch is disengaged following verification that the driver-selected gear has been selected;
    comparing a rotational speed of the transmission input with a predetermined speed range when it has been confirmed that the clutch is disengaged;
    automatically engaging a gear to be engaged when the rotational speed of the transmission input has reached the predetermined speed range;
    measuring elapsed time between selection of the driver-selected gear and subsequent disengagement of the clutch; and
    executing said step of automatically engaging only on condition that the elapsed time is less than a predetermined time span.

16. A process according to claim 15, further comprising:
erasing stored information on the driver-selected gear at the end of the predetermined time span.

17. A process according to claim 15, wherein the vehicle includes a detector for detecting a vehicle speed, the steps of the process being executed on the condition that the vehicle speed is below a predetermined speed value.

18. A process according to claim 17, wherein the predetermined speed value is representative of a vehicle speed close to vehicle stoppage.

19. A process according to claim 15, wherein the predetermined speed range can be changed as a function of vehicle speed.

20. A process according to claim 15, wherein the predetermined speed range can be changed as a function of a speed of a transmission output.

21. A process according to claim 15, wherein the predetermined speed range can be changed as a function of a gear ratio to be expected for the gear to be engaged.

22. A process according to claim 15, wherein the gear to be engaged is the driver-selected gear.

23. A process according to claim 15, further comprising:
determining whether a different gear would be better suited than the driver-selected gear as the gear to be engaged under existing operating conditions of the vehicle; and
using the different gear as the gear to be engaged on condition that the different gear is determined to be better suited.

24. A process according to claim 15, further comprising:
storing information on the predetermined speed value in a re-writeable, non-volatile memory located in the control system for the transmission.

25. A process according to claim 15, further comprising:
storing information on the predetermined speed range in a re-writeable, non-volatile memory located in the control system for the transmission.

26. A process according to claim 15, further comprising:
optically displaying an instruction to actuate the clutch if it is engaged.

27. A process according to claim 15, wherein the driver-selected gear selected by means of the operating unit is displayed optically.

28. A process according to claim 15, wherein the clutch must be driver-actuated.

29. A process for the control of a transmission, with a plurality of gears, for an engine-driven vehicle which includes a control system for the transmission, a clutch to connect the engine to the transmission, an operating unit for the selection of a desired gear and a detector for detecting a rotational speed of a transmission input, the process comprising:
verifying whether a driver-selected gear is selected by means of the operating unit;
confirming whether the clutch is disengaged following verification that the driver-selected gear has been selected;
comparing a rotational speed of the transmission input with a predetermined speed range when it has been confirmed that the clutch is disengaged;
automatically engaging a gear to be engaged when the rotational speed of the transmission input has reached the predetermined speed range; and
optically displaying an instruction to actuate the clutch if a driver-selected gear has been selected and the clutch is engaged.

30. A process according to claim 29, wherein the vehicle includes a detector for detecting the vehicle speed, the steps of the process being executed on condition that the vehicle speed is below a predetermined value.

31. A process according to claim 30, wherein the predetermined speed value is representative of a vehicle speed close to vehicle stoppage.

32. A process according to claim 29, wherein the predetermined speed range can be changed as a function of vehicle speed.

33. A process according to claim 29, wherein the predetermined speed range can be changed as a function of a speed of a transmission output.

34. A process according to claim 29, wherein the predetermined speed range can be changed as a function of a gear ratio to be expected for the gear to be engaged.

35. A process according to claim 29, wherein the gear to be engaged is the driver-selected gear.

36. A process according to claim 29, further comprising:
determining whether a different gear would be suited than the driver-selected gear as the gear to be engaged under existing operating conditions of the vehicle; and
using the different gear as the gear to be engaged on condition that the different gear is determined to be better suited.

37. A process according to claim 29, further comprising:
storing information on the predetermined speed range in a re-writeable, non-volatile memory located in the control system for the transmission.

38. A process according to claim 29, further comprising:
measuring elapsed time between selection of the driver-selected gear and subsequent disengagement of the clutch; and
executing said step of automatically engaging only on condition that the elapsed time is less than a predetermined time span.

39. A process according to claim 38, further comprising:
erasing stored information on the driver-selected gear at the end of the predetermined time span.

40. A process according to claim 29, wherein the driver-selected gear selected by means of the operating unit is displayed optically.

41. A process according to claim 29, wherein the clutch must be driver-actuated.

* * * * *